United States Patent [19]

Pepper, Jr.

[11] 4,198,539
[45] Apr. 15, 1980

[54] SYSTEM FOR PRODUCING ELECTRIC FIELD WITH PREDETERMINED CHARACTERISTICS AND EDGE TERMINATIONS FOR RESISTANCE PLANES THEREFOR

[75] Inventor: William Pepper, Jr., Bethesda, Md.

[73] Assignee: Peptek, Inc., Bethesda, Md.

[21] Appl. No.: 867,256

[22] Filed: Jan. 5, 1978

Related U.S. Application Data

[63] Continuation-in-part of Ser. No. 759,931, Jan. 19, 1977, abandoned.

[51] Int. Cl.² .............................................. G08C 21/00
[52] U.S. Cl. ..................................................... 178/18
[58] Field of Search ............................... 178/18, 19, 20

[56] References Cited

U.S. PATENT DOCUMENTS

3,798,370   3/1974   Hurst ..................................... 178/18

Primary Examiner—Thomas A. Robinson
Attorney, Agent, or Firm—Jim Zegeer

[57] ABSTRACT

A system is described for coupling two voltage sources to a resistive plane, surface or layer so as to produce a uniform electric field in said plane with orthogonal components along the two axes of the plane generated by the two voltage sources so that coordinates of position of a digit or finger in the field may be determined. Techniques are described for fabricating both the plane and the coupling elements from the same resistive material. It is also shown how nonlinear electric fields can be created while preserving orthogonality. Three-dimensional fields of predetermined characteristics can be created by extending the techniques to curved surfaces and by using multiple surfaces.

26 Claims, 14 Drawing Figures

SYSTEM FOR PRODUCING ELECTRIC FIELD WITH PREDETERMINED CHARACTERISTICS AND EDGE TERMINATIONS FOR RESISTANCE PLANES THEREFOR

This application is a continuation-in-part of my application Ser. No. 759,931, filed Jan. 19, 1977, now abandoned, and is an improvement on my application Ser. No. 717,192, filed Aug. 24, 1976, now U.S. Pat. No. 4,071,691 issued Jan. 31, 1978.

BACKGROUND OF THE INVENTION

This invention is an improvement on the invention described in my U.S. patent application Ser. No. 717,192, titled "Human-Machine Interface Apparatus" and filed Aug. 24, 1976 now U.S. Pat. No. 4,071,691, issued Jan. 31, 1978 and incorporated herein in its entirety by reference. The present invention improves the orthogonality of field components in Human-Machine Interface Apparatus and further provides a means of correcting any nonlinearity in the phase field generated by one embodiment of the Human-Machine Interface Apparatus. The present invention improves the utility of the invention disclosed in my above-identified patent by simultaneously correcting for two sources of nonlinearity. Thus, when the invention is used to input information into a machine by a human, for example, nonlinearity of the field does not have to be compensated for by additional circuitry.

The method of generating and controlling electric fields described herein has wider potential usefulness, both for correcting field nonlinearities and for producing fields of predetermined nonlinear characteristics in two or three dimensions.

BRIEF SUMMARY OF THE INVENTION

The preferred embodiment of the invention described herein comprises a four-sided field defining surface or plane, an electrode system, and electrical connecting parts for coupling each electrode to one edge, respectively, of the surface or plane, voltage supply means for exciting the electrodes, and a resistor network for coupling the voltage sources to the electrodes.

The four-sided surface, which in a preferred embodiment is a rectangular plane, has uniform resistivity throughout. When appropriate voltages are imposed along its edges by the electrodes, the current density is identical in amplitude and direction at all points in the field defining plane so that any accompanying electrical field produced is linear and maintains orthogonality.

The electrodes are substantially linear resistance elements of low resistivity relative to the plane. If a potential difference is established between the ends of an electrode, points along the electrode will assume potentials proportional to their distance from one end. The X electrodes are coupled to the edges of the rectangular plane that are normal to the X axis of the plane, and the Y electrodes are similarly coupled to the other two edges.

Each connecting part provides a pathway for current between one edge of the plane and a corresponding electrode. In a preferred embodiment the resistive paths between the edge of the plane and the electrode, beginning at the corner and extending to the center of the electrode, are varied to electrically adjust the current and hence the electric field produced thereby. In the preferred embodiment, the resistance increases parabolically towards each end, thus compensating for the resistance of the electrode so as to produce uniform current density through the edge of the plane when the same potential is applied to both ends of the electrode. However, if some characteristic other than linearity and orthogonality is desired, it can be achieved by tailoring the resistivity of the electrodes and connecting parts accordingly. Moreover, instead of having parabolically decreasing resistance of the connecting parts towards the center of the electrode, one would not go beyond the invention by feeding at the center of the electrodes and decreasing resistance of the connecting parts parabolically towards the corners of the rectangular plane.

The two voltage sources create the X and Y field components when coupled to the plane by the other parts. They can take a variety of forms and can produce either ac or dc voltages.

The resistor network for coupling the voltage sources to the electrodes serves the function of imposing a voltage on each end of each electrode such that the resulting voltages at the corners of the rectangular plane are the four algebraic sums of the bipolar X and Y components generated by the voltage sources.

DETAILED DESCRIPTION

Figure 1A:
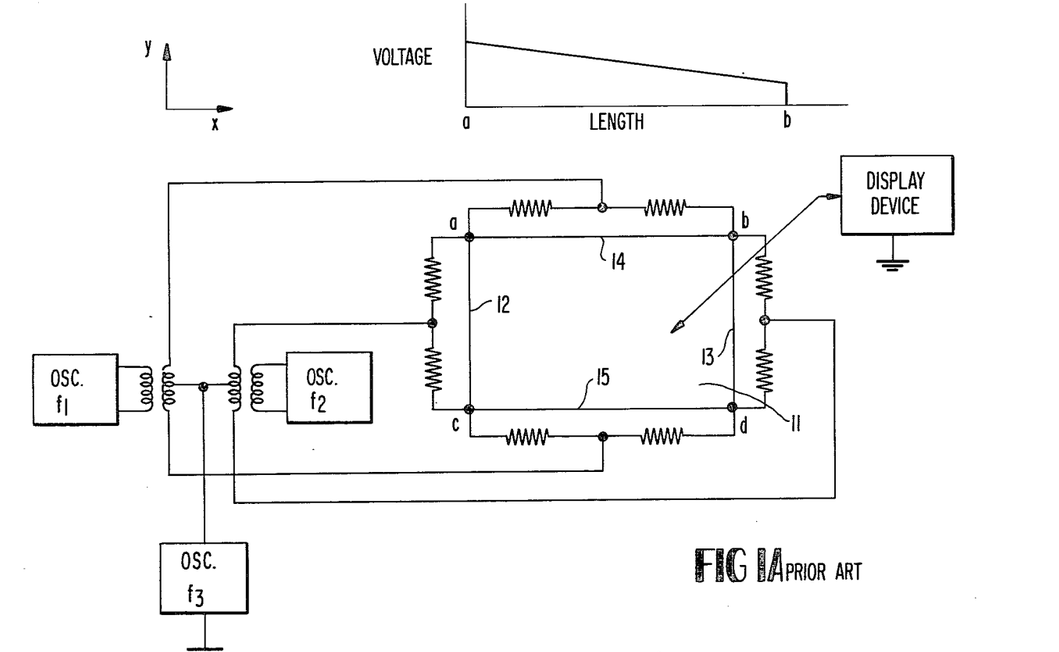
FIG. 1A is a reproduction of FIG. 2 of U.S. Pat. No. 2,925,467.

FIG. 1 is a reproduction of FIG. 2 of U.S. Pat. No. 2,925,467 titled "Electrographic Transmitter" and issued to F. K. Becker on Feb. 16, 1960. The parts of this figure to be discussed are the plane (11) and the conductive electrodes (12–15) bounding the plane. According to Becker's patent (Col. 3, line 22):

"By applying a voltage between the corner extremes of the electrodes bounding the opposite X dimension edges of the surface, the two electrodes bounding the opposite Y dimension edges are maintained at uniform potentials throughout their entire lengths. Thus, the IR drop in each of the individual Y dimension electrodes is zero and the two electrodes are held at different potentials corresponding respectively to the potentials of the opposite ends of the X dimension electrodes."

I have discovered that this is erroneous. Let X and Y axes intersect at the center of a square plane with sides of 2 units length parallel to the axes. If the current density in the plane is assumed to have a uniform value $\iota$ parallel to the Y axis (perpendicular to the Y electrodes), a current must flow in each Y electrode with the following distribution:

$$I(x) = \int_0^x \iota\, dx \qquad (1)$$
$$I(x) = \iota x$$

If the resistance of each electrode is R, this current $I(x)$ will produce the following voltage distribution, relative to the center of the electrode, in each Y electrode:

$$E(x) = \int_0^x \frac{R}{2} \iota x\, dx \qquad (2)$$
$$E(x) = \frac{\iota R x^2}{4}$$

Therefore, it is erroneous to say that the Y electrodes are maintained at uniform potentials throughout their entire lengths. For a ratio of ten to one for the resistivity of the plane and resistance of the electrode, respectively, as suggested by Becker, Eqn. 2 gives a potential difference between the centers of the Y electrodes that is 2.5% lower than the potential difference between the ends. The variation in voltage along the Y electrodes causes the actual current density in the plane to be nonuniform in the Y axis and to also have a small X-axis component. The nonuniformity in current density produces a nonlinear potential distribution. This nonlinearity can be reduced by increasing the ratio of the resistivity of the plane to the resistance of the electrodes, but only at a penalty of increased power dissipation in the electrodes or undesirably high resistivity of the plane surface, or both.

Figure 1B:
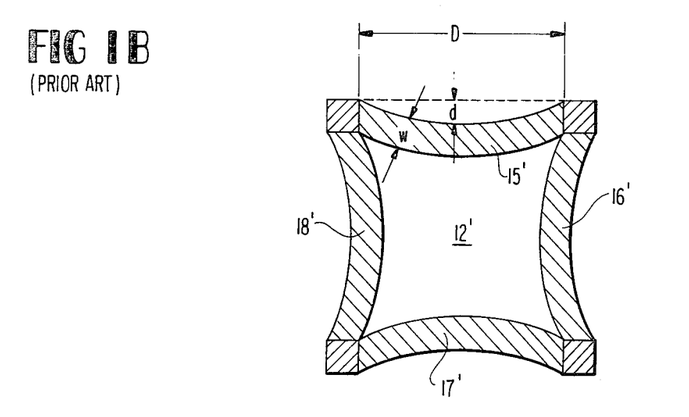
FIG. 1B is a reproduction of FIG. 10 of U.S. Pat. No. 3,591,718.

FIG. 1B is a reproduction of FIG. 10 of U.S. Pat. No. 3,591,718 titled "Graphical Input Tablet" and issued to Shintare Asane and Larry K. Baxter on July 6, 1971. This figure shows an electrical writing tablet for coacting with a pencil-like stylus and an approach to achieving linearity by giving the writing surface a pin cushion configuration bounded by parabolic low resistivity strips. The patent describes this figure as follows:

"Referring to FIG. 10, there is shown a preferred tablet arrangement that is especially useful when using practical resistive materials having less than ideal resistance characteristics. The tablet 12' is of generally pin cushion configuration bounded by parabolic low resistivity strips 15', 16', 17' and 18' of width w and peak deflection from a chord joining their ends of d. If the resistance of each strip 15', 16', 17' and 18' is R and the length of a chord spanning each strip D, the relationship of the quantities is given by $d/D = R/\rho$. A typical value of the resistivity $\rho$ is 2,000 ohms per square while that for R of the parabolic strips is 10 ohms per square."

Thus, in place of a rectangular configuration of FIG. 1, which it is noted is the same as Becker's FIG. 2 (FIG. 1A herein), Asano and Baxter suggested a pin cushion configuration for their writing surface. However, as indicated in Baxter U.S. Pat. No. 3,624,293, co-inventor Baxter concluded the linearity was not good in the system of U.S. Pat. No. 3,591,718 and that it was difficult to maintain a desired practical sheet resistivity in production at reasonable cost. This Baxter patent seeks linearity through use of sets of X-Y resistance wires separated by an insulating sheet.

THE PRESENT INVENTION

Figure 2:
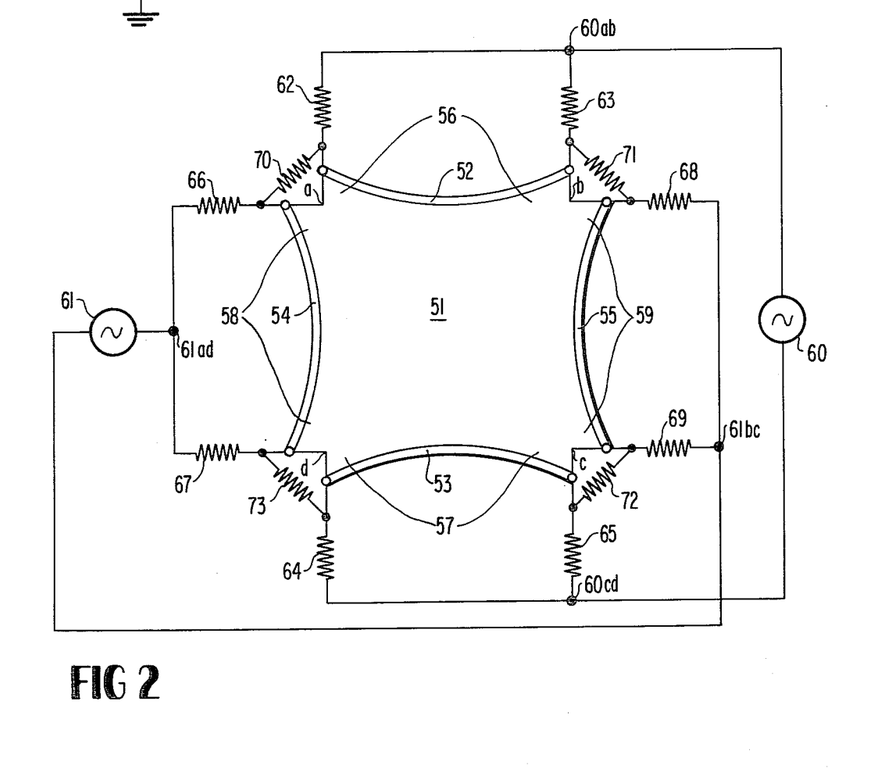
FIG. 2 is a diagram of the preferred form of this invention.

FIG. 2 shows the preferred form of this invention, in which an electric field is created whose uniformity is limited only by the state of the art of fabricating resistive materials. Plane surface 51 includes a rectangular square having corners a, b, c, and d and is composed of resistance material of uniform resistivity. Electrodes 52–55 are of low resistivity relative to the resistivity of plane surface 51. These electrodes can be fabricated from the same material as plane surface 51 by appropriate control of the cross-sectional thickness of the plane surface and electrodes, or they can be created by adding a layer of lower-resistivity material along the edges of the plane surface by various printing techniques, such as silk screen printing. Connecting parts 56–59 consist of extensions of the square plane surface 51 connecting it to the four electrodes. If the resistivity per square of both the plane surface 51 and the connecting parts 56–59 is $R_1$, the resistance of each of the electrodes 52–55 is $R_2$, and the length of each side of the square is 2, then the boundary between connecting part 56 and electrode 52 is described by:

$$y = 1 + \frac{R_2}{2R_1} \int_0^x x\, dx \qquad [-1 \leq x \leq 1] \qquad (3)$$
$$y = 1 + \frac{R_2}{4R_1} x^2$$

where the origins of the X and Y axes are at the center of the square. The other boundaries are similar. One terminal 60ab of voltage source 60 is connected to the ends of electrode 52 through equal-valued resistors 62 and 63, and the other terminal 60cd of voltage source 60 is connected to the ends of electrode 53 through equal-valued resistors 64 and 65. The other voltage source 61 is similarly connected to the ends of electrodes 54 and 55 through resistors 66–69.

The voltage sources are preferably floating relative to each other. In this embodiment, the ends of the electrodes are resistively connected together by balancing resistors 70–73. Electrodes 52–55 are identical and preferably have a resistance one-tenth the resistivity per square of the plane. In theory their cross-sectional area should change slightly along their length to give equal increments in resistance for equal increments in distance along the adjacent edge of the square; for most purposes the error caused by a uniform cross-sectional area is negligible. Resistors 62–69 are identical and may conveniently have the same resistance as the electrodes 52–55. Resistors 70–73 have the value:

$$R_4 = \frac{R_2^2 R_3}{4R_1(R_2 + 2R_3)} \quad (4)$$

where $R_1$ is the resistivity per square of the plane 51, $R_2$ is the resistance of the electrodes 52-55, and $R_3$ is the resistance of resistors 62-69.

Analysis of the voltage distribution in this system is simplified by considering the contribution from one voltage source and neglecting the contribution from the second source. If the voltage source 60 produces an electric field along the Y axis, it will be found that the voltage at a given height y is the same for all values of x in the plane. The voltage in the X electrodes will also have this value at height y, with resistors 70-73 providing a potential drop equal to the potential drop in the connecting parts at the corners, so no current will flow between the X electrodes and the plane. The potential gradient will therefore be uniform throughout the plane. It can now be shown, by the superposition principle for linear systems, that the two orthogonal vector components of the current density parallel to the X and Y axes are proportional everywhere in the plane to the X and Y applied voltages.

Figure 3:
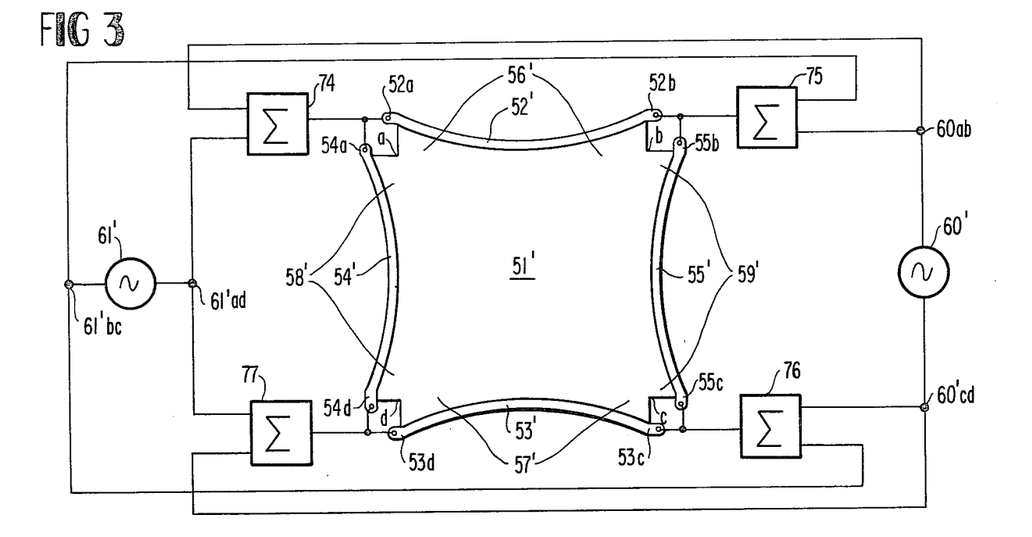
FIG. 3 is a diagram of a variation of FIG. 2 in which the voltage sources are isolated from each other and the circuit connecting the voltage sources to the electrodes is simplified.

FIG. 3 shows a simpler version of the arrangement of FIG. 2 in which summing amplifiers 74-77 isolate the voltage sources from each other so they do not have to be floating. The connections to the plane are simplified by removing resistors 70-73 of FIG. 2 and extending the electrodes a short distance beyond the boundary with the connecting parts 56', 57', 58' and 59' as indicated at 52a, 52b, 53c, 53d, 54a, 54d, 55b and 55c, respectively. This distance, as a fraction of the length of one side of the square, is given by:

$$\Delta e = \frac{(R_2)^2}{2(R_1)^2} \quad (5)$$

For a ratio of $R_2/R_1$ of 0.1, this simplification causes an error at the corners of about 0.25%.

Figure 4:
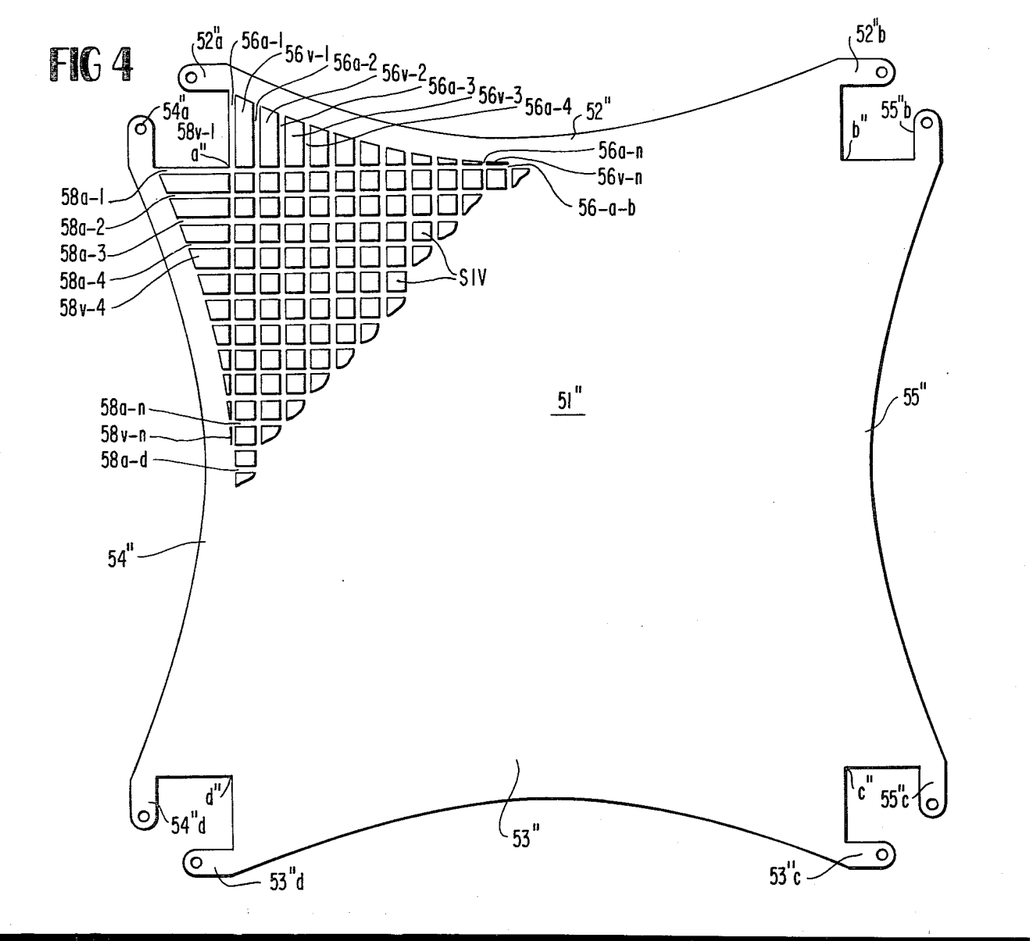
FIG. 4 is a view of a square resistive plane with the same function as plane surface (51) in FIG. 2, but fabricated by a different technique.

FIG. 4 shows a further embodiment for fabricating the rectangular square plane surface 51", electrodes 52", 53", 54" and 55", and connecting parts from the same material. This has the practical advantage that the absolute value of resistivity of the material becomes unimportant. Whereas the resistivities of both the plane and the electrodes must be controlled in the embodiments of FIG. 2 and FIG. 3 in order to control the ratio $R_2/R_1$, in the embodiment of FIG. 4 this ratio is controlled by geometry and is independent of absolute resistivity.

The resistance structure shown in FIG. 4 has "corners" a", b", c", and d", which correspond to corners a, b, c, and d of FIG. 2; electrodes 52", 53", 54", and 55" which correspond to electrodes 52, 53, 54, and 55 of FIG. 2; and connector tabs 54"a, 52"a, 52"b, 55"b, 55"c, 53"c, 53"d and 54"d at the ends of the electrodes 52", 53", 54", and 55", the letter suffix correlating same to its related corner.

The difference in resistivity between the electrode 52" and the square plane surface 51" and the multiple portions 56a-1, 56a-2, 56a-3 ... 56a-n of the connecting parts 56 is achieved by a multiplicity of voids 56v-1, 56v-2 in the material of the connecting parts and 51v in the square plane thereby changing the continuous surface into a network or matrix of small elements. the same plane of voids is provided in each of the connecting parts as is indicated with respect to 58a-1 ... 58a-n and 58v-1 ... 58v-n. Such a network can easily be made by a variety of techniques, such as, for example, masking a plane of resistive material with photoresist and etching out the voids, or, as another example, silk-screening the network on an insulating substrate with resistive ink.

In all the embodiments described so far, the uniformity of the electric field depends on the uniformity of resistivity of the material constituting the plane surface. There are applications for this invention, however, for which it is difficult to obtain material with adequate uniformity of resistivity. For instance, said Human-Machine Interface Apparatus can be constructed with a transparent control surface to go in front of a video display such as a CRT or plasma panel in a computer graphic terminal, allowing direct human interaction with the computer by touching a point on the display. Transparent tin oxide coatings can be deposited on glass and etched with hydrochloric acid and powdered zinc to create a control surface of the kind shown in FIG. 4, but tin oxide coatings are not readily available with uniform resistivity over an area as large as the face of a graphic terminal. If the resistivity of a surface is measured at a multiplicity of points on the surface, the width of the individual elements of the surface 51" in FIG. 4 can be varied in fabrication to compensate for the variation in resistivity and create elements of uniform resistance.

There are a number of ways this can be accomplished. A technique well-suited to quantity production would consist of measuring the resistivity of sheets of resistive material on a conveyor belt with a multiplicity of rolling or sliding contacts. The resistivity measurements would be digitized and stored in a computer memory. After the sheets of resistive material had been coated with photoresist, a mask corresponding to the pattern of FIG. 4 would be placed over the sheets. The sheets would then pass under a modulated-beam scanner and the exposure given the photoresist would be varied by the computer as a function of the stored resistivity measurements. After the photoresist was developed and the sheets etched, the line widths of the elements of the surface would have the required variation to produce uniform element resistances. This technique is analogous to the well-known graphic arts process for making half-tone engravings.

Figure 6:
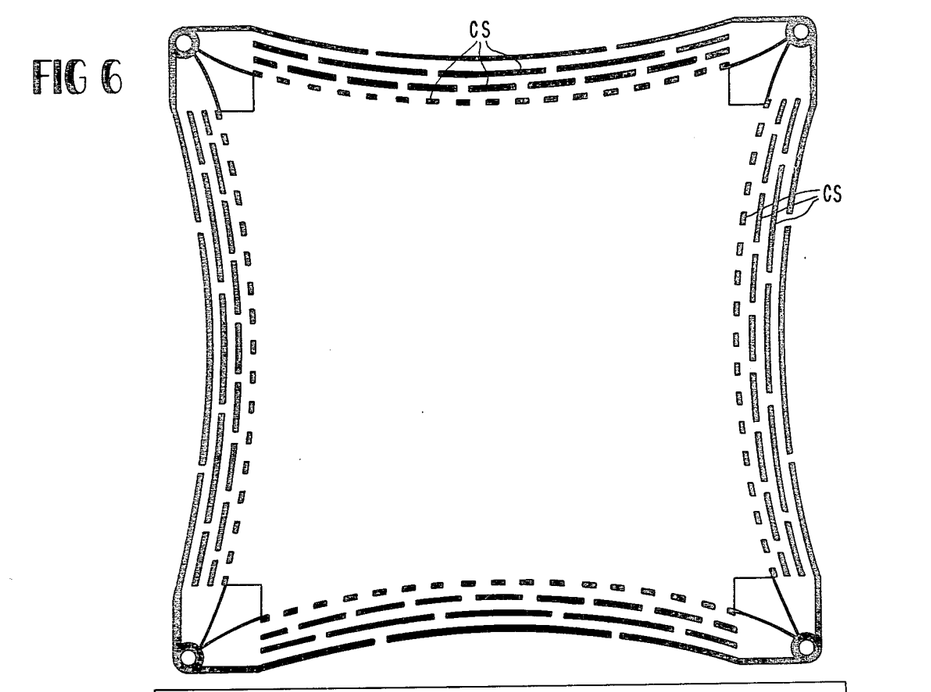
FIG. 6 is a further embodiment of the invention in which the resistivity of the electrodes is established by printing conductive segments on a resistive layer.

FIG. 6 shows another embodiment in which the absolute resistivity does not have to be closely controlled. In this embodiment the resistivity of the electrodes is established by overlaying the resistive material with conductive segments CS. These conductive segments CS can conveniently be produced by silk screening them with silver-filled ink. This embodiment is less expensive to implement than the embodiment of FIG. 3 because silk screening is inexpensive and the uniformity of resistivity of the conductive segments does not have to be closely controlled.

Figure 7:
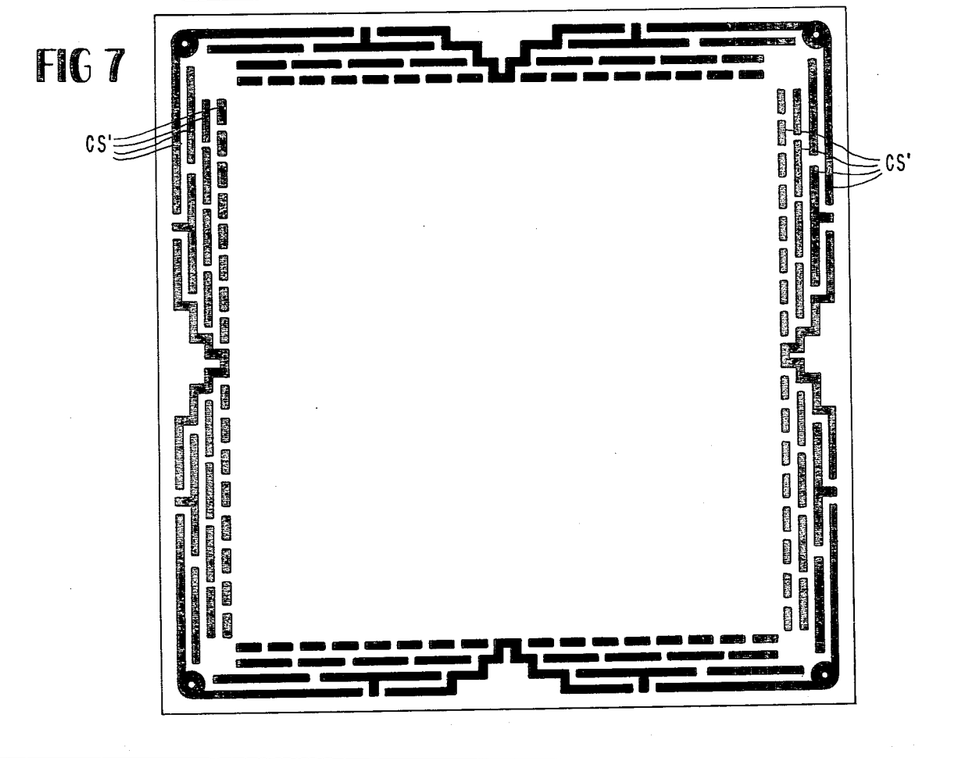
FIG. 7 is an extension of the embodiment shown in FIG. 6.

FIG. 7 is an embodiment in which the function of the connecting parts in FIG. 6 is incorporated into the pattern of conductive segments CS', reducing the outside dimensions of the device and the amount of resistive material required. The geometry of the conductive segments CS' in FIG. 7 was optimized by iterative modification of a system of simultaneous linear equations representing the network of resistances between conductive segments CS'.

Figure 8:
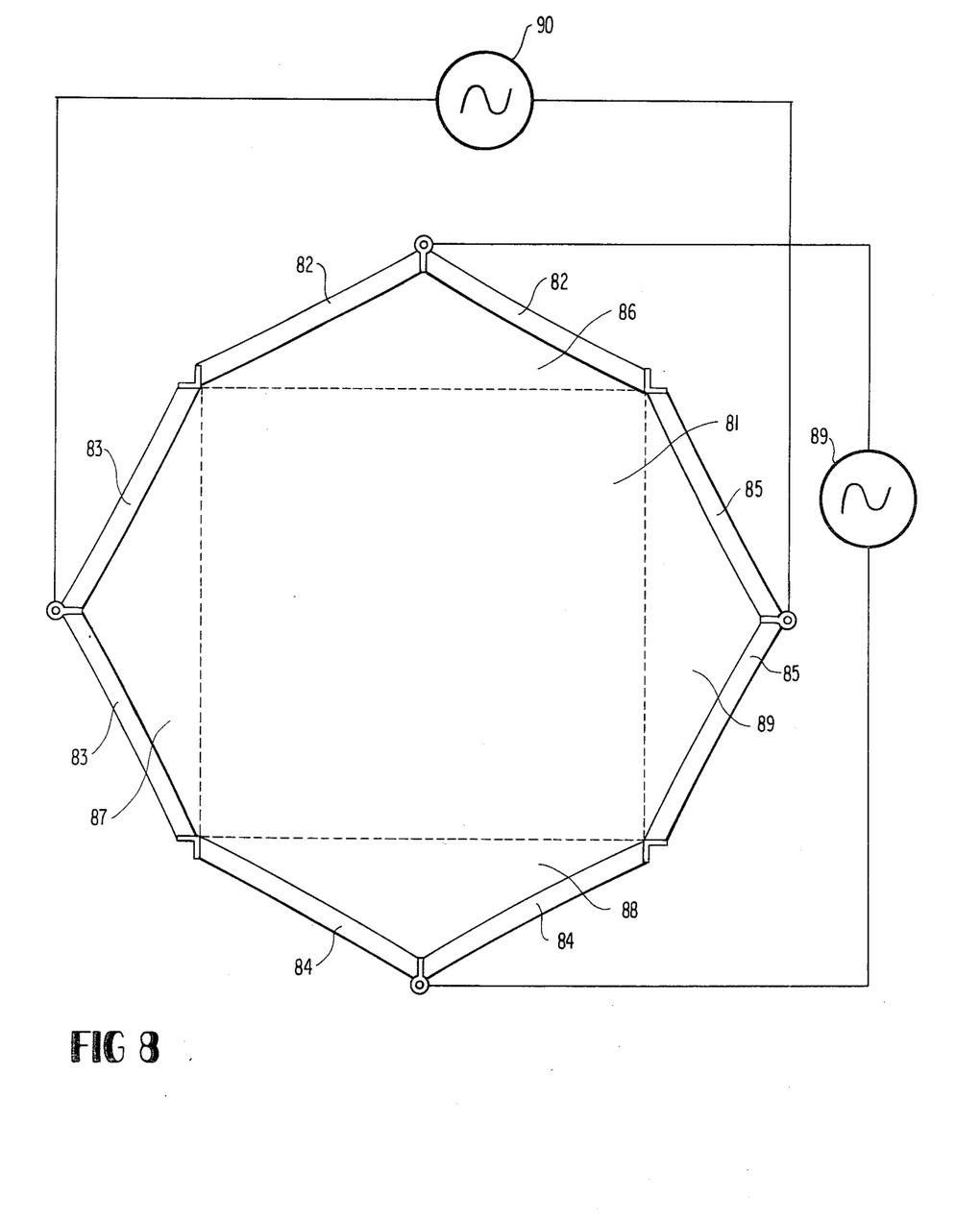
FIG. 8 illustrates a driving circuit for a further embodiment of the invention.

FIG. 8 shows a different form of the invention. Plane surface 81 is surrounded by four center-fed electrodes 82, 83, 84, and 85. These electrodes are joined at their ends. The boundary between connecting part 86 and electrode 82 is described by:

$$y(x) = 1 + \frac{(1 - |x|)}{2} + \frac{R_2}{4R_1}(1 - |x|)^2 \ [-1 \leq x \leq 1] \quad (6)$$

where the origins of the X and Y axes are at the center of the square, $R_1$ is the resistivity of the plane surface, and $R_2$ is the resistance of the electrode. The other boundaries are similar. The geometry of the figure is for a ratio $R_2/R_1$ equal to 0.1. If the voltage sources 89 and 90 are floating with respect to each other, the current density will be the same in amplitude and direction everywhere in plane surface 81, and the orthogonal vector components parallel to the X and Y axes will be proportional everywhere to the X and Y applied voltages. The techniques illustrated by FIGS. 5, 6 and 7 can also be used to fabricate the structure of FIG. 8.

NONLINEAR FIELDS

An electric field with a predetermined nonlinearity in one or both axes can be created by introducing an appropriate variation in resistivity into the plane surface. If the electrodes are given similar variations in resistivity and the connecting parts are modified appropriately, certain classes of nonlinear surfaces can be created in which the current density is the same everywhere in the surface.

For example, in said Human-Machine Interface Apparatus the phase of the field generated by the arrangement shown in that patent application's FIG. 5 is given (along one axis) by:

$$\phi_x = \tan^{-1}\left(\frac{(x/L)\sin\phi_1}{1 - (x/L) + (x/L)\cos\phi_1}\right) \quad (7)$$

where $\phi_x$ is the phase angle relative to a first edge at a distance x from said first edge; $\phi_1$ is the phase difference between said first edge and the opposite edge; and L is the length from said first edge to said opposite edge. This phase angle $\phi_x$ has a maximum deviation of 4.52% from the desired function:

$$\phi_n = (x/L)\phi_1 \quad (8)$$

This deviation can easily be corrected. If the plane surface is made by the technique illustrated in FIG. 4, the necessary change in resistivity is created by calculating the difference between Eqn. (7) and Eqn. (8) over the interval occupied by each element in the plane, and making a corresponding change in the width of the element. The continuous plane surface of FIG. 3 can be given a similar nonuniform resistivity by varying the thickness of the resistive material.

TOPOLOGICAL DISTORTIONS

Various linear and nonlinear fields can be produced by topological distortions of the plane surface (and electrodes), such as making opposite edges of the surface unequal in length and/or changing the angles between adjacent sides of the plane surface, and by giving various predetermined relationships to the voltages applied at the four corners of the surface.

Figures 9, 10, 11:
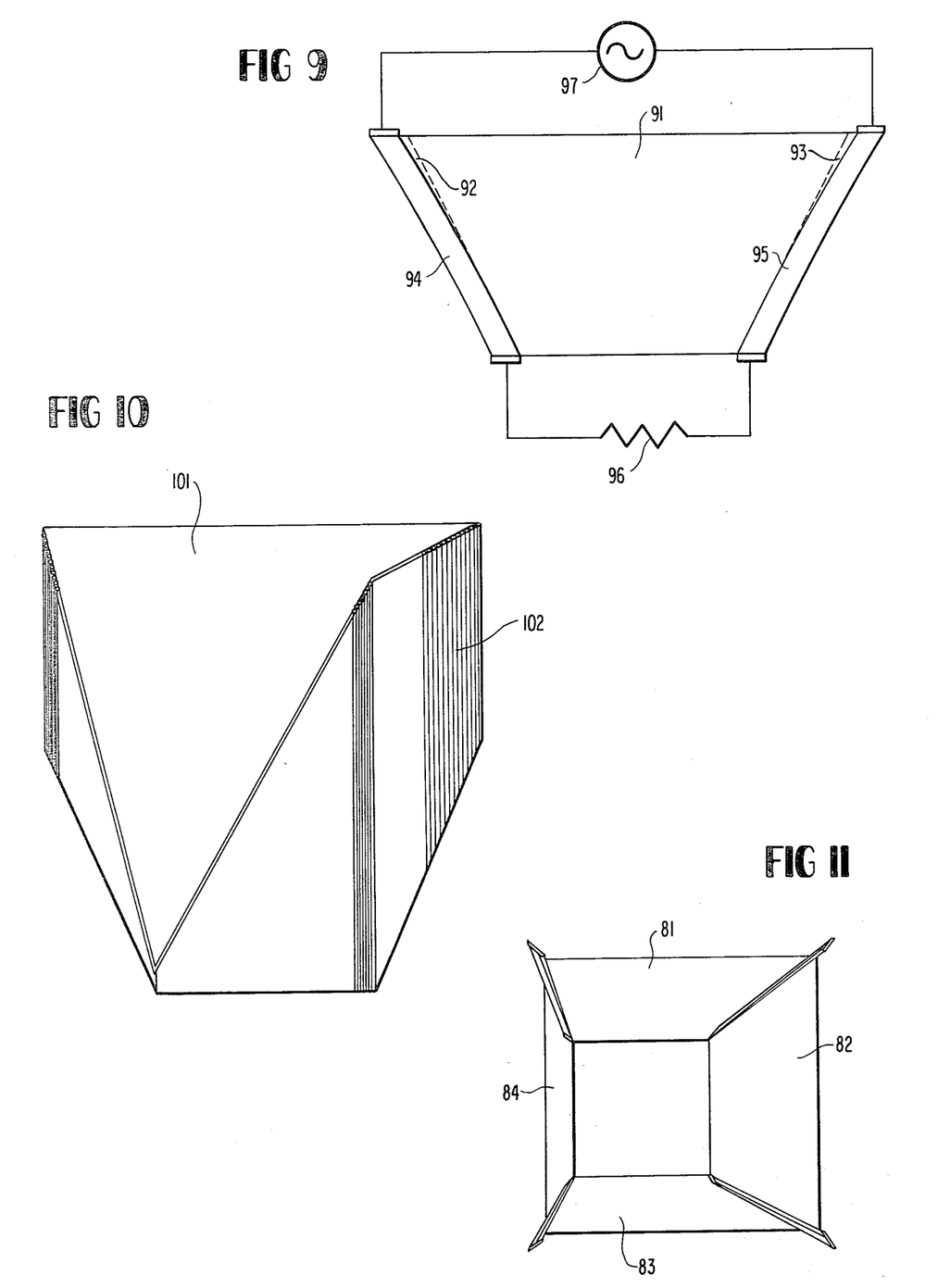
FIG. 9 illustrates a trapezoidal plane surface in a further embodiment of the invention.
FIG. 10 illustrates an extension of the invention by use of field-transferring wire bundles.
FIG. 11 illustrates the use of the embodiment illustrated in FIG. 9 to create a three-dimensional field for electron beam deflection, and FIG. 12 discloses a further embodiment of the invention wherein third dimension is given to the apparatus wherein the pressure of the human finger is converted to an electrical signal.

FIG. 9 shows a trapezoidal plane surface 91 of uniform resistivity, bounded on two sides by connecting parts 92 and 93 of the same resistivity and electrodes 94 and 95 with resistivity typically 1/10 that of the plane surface. If the length of the shorter base of the tapezoid is taken to be 2 units, the height is taken to be 2 units, and the center of the shorter base is taken to be zero in both X and Y axes, the boundary between connecting part 92 and electrode 94 is described by:

$$x = 1 + \frac{y}{2} + \frac{y^2 R_2}{4R_1} \quad (9)$$

where $R_1$ is the resistivity of the plane surface and $R_2$ is the resistance of the electrode. A resistor 96 with value $2R_2$ is connected between the ends of the electrodes adjacent to the shorter base, and a voltage source 97 is connected to the other two ends. A uniform electric field is created in the trapezoidal plane surface with magnitude proportional to the voltage applied by the voltage source to the electrodes. A three-dimensional combination of these trapezoidal surfaces is shown in FIG. 11 and discussed under the heading "Three-Dimensional Fields."

FIELD-TRANSFERRING WIRE BUNDLES

FIG. 10 is an example of another way to produce an electric field of predetermined characteristics, using a technique analogous to fiber optics. The field-generating surface is a rectangular plane surface 101 of uniform resistivity twisted into a hyperbolic paraboloid. Electrodes and connecting parts produce a uniform field in this surface but are omitted from FIG. 10 for clarity. Each wire of a field-transferring bundle of parallel insulated wires 102 makes electrical contact at one end with the field-generating surface and is cut off at the other end, forming a plane trapezoidal surface that is a projection of the hyperbolic paraboloid. It will be seen from this example that a great variety of controllable electric fields can be created by combinations of surfaces and geometric transformations using field-transferring wire bundles.

THREE-DIMENSIONAL FIELDS

Generating an electric field in a plane also creates a field in the area of space adjacent to the plane, of course. Controlled three-dimensional space fields of predetermined characteristics can be created by combinations of field-generating surfaces and by making field-generating surfaces curved instead of flat.

Figure 5A:
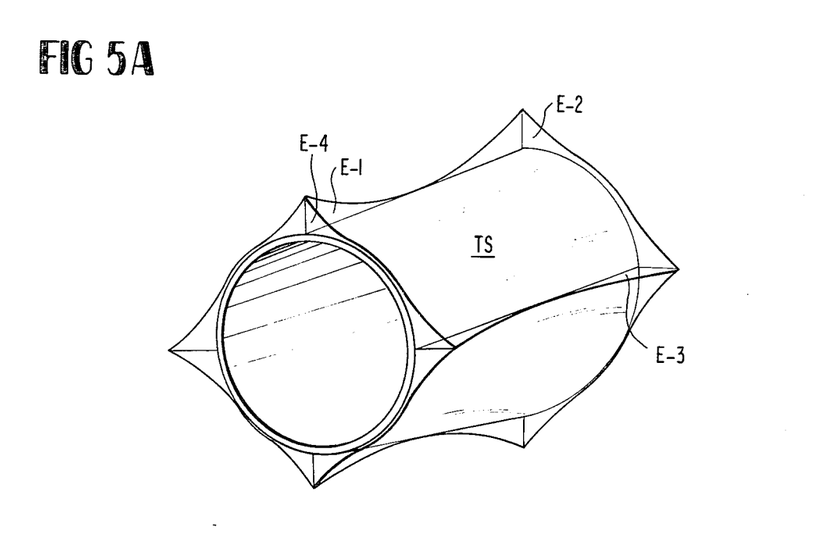
FIG. 5A is a perspective view of an assembly of four curved planes with a geometry forming a cone.
Figure 5B:
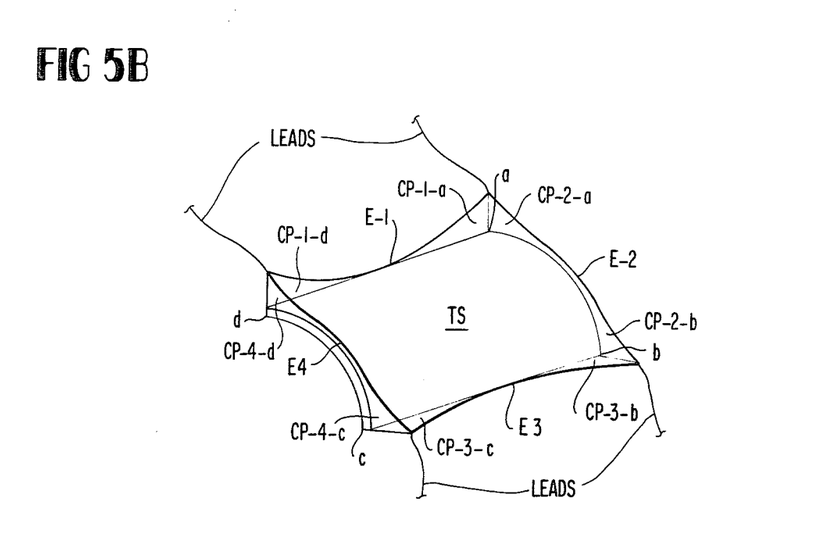
FIG. 5B is a perspective view of one of the four curved planes with geometry.

Referring to FIGS. 5A and 5B, a conical electrode assembly is shown in FIG. 5A which comprises four curved resistive planes or surfaces each of which has a trapezoidal geometry. As shown in FIG. 5B, the electrodes are designated by E-1, E-2, E-3 and E-4 with the corresponding exponential resistive connecting parts CP-1-a, . . . CP-4-d. The curved trapezoidal surface T-S (corresponding to surface 51) encompasses one fourth the surface of a cone which thereby establishes a nonrectangular field. If the surface were a right circular cylinder, the fields would be rectangular. With adjoining and/or continuous edges of the resistive plane as shown in FIG. 5A, the electrodes E-1 as well as the connecting parts may commonly drive edges of the two resistive planes.

The plane surfaces need not be curved and there may, for example, be two pairs of opposed surfaces juxtaposed as in the deflection plates of a cathode ray tube.

FIG. 11 shows as an example an electrode structure for deflection of an electron beam. Four trapezoidal surfaces 81, 82, 83, and 84 of the kind shown in FIG. 9 are combined in such a way that the space field inside the structure is uniform in all three dimensions and the X and Y field components are independently controllable. The electrodes and connecting parts have been rotated away from the surfaces to allow edge-to-edge fitting of the surfaces. A suitable technique for fabricating such a structure with adequate structural stability and electrical uniformity is to make the trapezoidal pieces out of lead glass. The pieces are covered with a passivating coating except for the area that is to be the control surface, connecting parts, and electrodes (the connecting parts and electrodes being on the edges of the pieces). Then the pieces are heated in a reducing atmosphere of hydrogen, converting a surface layer of lead oxide to metallic lead. By covering the control surface and connecting parts with a passivating coating and repeating the process, the electrodes are then given an appropriately lower resistivity.

THIRD DIMENSION

Figure 12:
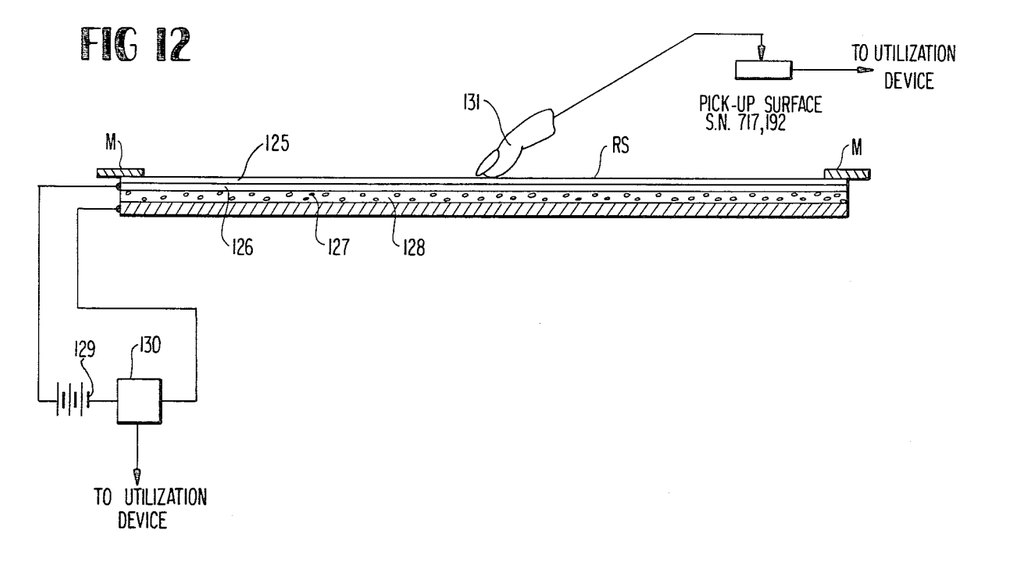

In my above-identified application besides X-Y position information corresponding to the position of the user's finger on the data input or control surface, I disclose a third dimension, namely, the presence or absence of the user's finger proximate the data input or control surface. In FIG. 12, there is disclosed an adaptation of that concept wherein not merely presence or absence can be detected but force or intensity as well. In FIG. 12 the field generating resistive surface RS, the active portion of which is exposed through a mask M, is carried on a flexible insulator such as a rubber or plastic sheet 125 which has a metallized undersurface 126 which serves as one electrode on carbon granules or layer 127 which, in turn, is supported on a rigid conductor or electrode 128. A power supply, such as battery 129, is connected through current detector 130 to electrodes 125 and 126. Pressure of a user's finger 131 on the surface RS compresses the carbon granules to a greater or lesser degree so that their resistance varies with finger pressure. This, in turn, produces a change or variation in current through current detector 130 which can serve as a further data input. Instead of carbon granules, more sensitive detection arrangements may be used; for example, the two electrodes 126 and 128 can be the electrodes of a condenser whose capacity varies with the distance between the electrodes. Obviously, other forms of pressure or force transducers may be incorporated in the system.

Other modifications, changes and embodiments of the invention will be apparent to those skilled in the art and it is intended that such apparent modifications, changes and embodiments be included in the spirit of the invention as defined by the appended claims.

I claim:

1. In combination with means having a resistive surface, a system of producing an electric field having predetermined electrical energy distribution characteristics along a first direction and predetermined electrical energy distribution characteristics along a second direction, said second direction being transversely oriented with respect to said first direction comprising, said resistive surface being provided with a first pair of opposed lateral edges and a second pair of opposed lateral edges, each of said laterally opposed edges having resistive electrode means therealong for distributively passing an electrical current into said resistive surface at incremental points of said opposed edges, respectively, and including resistance means for adjusting the distribution of current into said incremental points of said opposed edges of said resistive surface to thereby control the current supplied to said incremental points of said surface at the lateral edges thereof so as to establish a current flow between opposed lateral edges, and each said resistive electrode having a substantially uniform resistance per unit length, and said resistive surface including resistive edge extensions at a plurality of sequential points therealong, respectively, for limiting the current removed from said electrode at sequential points therealong, respectively, each said resistive electrode including a plurality of distributed conductor members along said laterally opposed edges, said distributed conductor members being carried by and in conductive contact with the surface of said resistive surface along the length of each distributed conductor member.

2. A current distributor for supplying electrical current to the edges of a rectangular resistive plane whereby a sequential series of points beginning at one edge of said rectangular resistive plane have currents therealong, comprising a resistive electrode member, and a plurality of resistive members sequentially connected between said electrode and said edge of said resistive plane, said resistance members having electrical resistance values which vary in a predetermined manner as a function of the distance from a first selected point at the edge of the plane to a second selected point thereof.

3. The invention defined in claim 2 wherein said resistive plane is rectangular and said variation in the value of said connecting resistances is parabolic.

4. A method of exciting a rectangular resistive plane having opposed resistive electrodes coextensive with the sides thereof comprising limiting current from said coextensive opposed resistive electrodes to each side of said rectangular resistive plane to equal values such that the field above said plane is linear.

5. An apparatus for producing a two-dimensional electric field comprising a rectangular resistive surface, and means for simultaneously coupling orthogonally related currents to all four edges of said resistive surface such that the field component parallel to a first side is everywhere proportional to a first excitation signal and at the same time the field component orthogonal to said first side is everywhere proportional to a second excitation signal.

6. An apparatus for producing a two-dimensional electric field as defined in claim 5 including a plurality of electrode means having low resistance per unit length relative to the resistance of said rectangular resistive surface, resistive connecting means, each providing a resistive connection between one side of said rectangular resistive surface and one of said electrodes, respectively, such that the resistance of said connection is a function of distance from the center of said side of said rectangular resistive surface, and means for applying excitation signals to the ends of said electrodes such that when a potential difference exists between the ends of a first electrode the same potential difference exists between the ends of the electrode connected to the opposite side of said rectangular resistive surface and the same potential relationship exists between corresponding points on the two sides of said rectangular resistive surface adjacent to said first electrode.

7. An apparatus for producing a two-dimensional electric field as defined in claim 6, wherein said rectangular resistive surface has uniform resistance per unit area, each of said electrodes has uniform resistance per unit distance parallel to the adjacent side of said rectangular resistive surface, the resistance of each of said connecting parts is a parabolic function of distance from the center of the adjacent side of said rectangular resistive surface, and said two-dimensional electric field has the same magnitude and direction everywhere in said rectangular resistive surface.

8. An apparatus for producing a two-dimensional electric field as defined in claim 6, wherein said rectangular resistive surface has a resistivity that varies as a function of location in the plane, each electrode has a resistivity that varies along its length in a manner congruent with the variation in resistivity of said rectangular resistive surface in the same direction, and said two-dimensional electric field does not have the same magnitude and direction everywhere in said rectangular resistive surface.

9. An apparatus for producing a two-dimensional electric field as defined in claim 6, in which the surface in which the field is produced is curved.

10. An apparatus for producing a two-dimensional electric field as defined in claim 9 in which the geometry of said curved surface and the characteristics of said electric field combine to produce a predetermined three-dimensional electric field.

11. An apparatus for producing a three-dimensional electric field comprising in combination, two or more resistive surfaces as defined in claim 6.

12. An apparatus for producing a two-dimensional electric field as defined in claim 6 wherein said means for applying excitation signals to the ends of said electrodes includes balancing resistance means connected between the proximate ends, respectively, of any two electrodes.

13. An apparatus for producing a two-dimensional electric field as defined in claim 6 wherein said electrode means include resistive extensions to which said excitation signals are applied.

14. The invention defined in claim 5 wherein said means for coupling orthogonally related currents to the edges of said rectangular surface include four center fed electrodes having low resistance per unit length relative to the resistance of said resistive surface, means joining the ends of said electrodes, respectively, bounding resistive surfaces connecting said electrodes to said rectangular resistive surface, said bounding resistive surface being defined by $$y(x) = 1 + \frac{(1 - |x|)}{2} + \frac{R_2}{4R_1}(1 - |x|)^2 \ [-1 \leq x \leq 1]$$

where the origins of the X and Y axes are at the center of said rectangle, $R_1$ is the resistivity of the said rectangle, and $R_2$ is the resistivity of the electrode.

15. The invention defined in claim 5 wherein said rectangular plane surface is formed into a surface of predetermined topology and a field transferring means for making electrical contact with said resistive field generating surface.

16. The invention defined in claim 5 including a field transferring means, said field transferring means including a bundle of elongated conductor elements, each element having one end contacting said surface and the opposite end terminated in relation to the other ends of the other elements to define a field of predetermined configuration.

17. The invention defined in claim 5 wherein said means for coupling orthogonally related currents to the edges of said resistive surface include lateral extensions of said resistive surface, and a plurality of distributed conductor members on said lateral extensions, respectively, said distributed conductor members being carried by and in contact with said lateral extensions along the length of each distributed conductor member to parabolically vary the resistance of the resistive surface therebelow.

18. Apparatus for creating an electric field above a surface, said electric field having a predetermined linearity characteristic, comprising a plane resistive surface having a predetermined number of sides, and resistive electrode means at two laterally opposed sides of said predetermined number of sides for distributively supplying a current to said sides including a supply connected to one end of each of said resistive electrodes, and an impedance connecting the opposite ends of said two resistive electrodes, each said resistive electrode including a plurality of distributed conductor members along said laterally opposed sides, said distributed conductor members being carried by and in conductive contact with the surface of said resistive surface along the length of each distributed conductor member.

19. A human-machine interface apparatus comprising,
a first transducer comprising a resistive surface and means for supporting said resistive surface such that pressure exerted by a human finger thereon transmits a force in a direction normal to said surface, means for coupling orthogonally related currents to the edges of said resistive surface such that a field component parallel to a first side is everywhere proportioned to a first excitation signal as a function of distance from a selected point on said surface and the field component orthogonal to said first side is everywhere proportioned to a second excitation signal as a function of distance from said selected point, and
a second data transducer comprising means mechanically coupled to said resilient surface for translating said force in a direction normal to said surface to a first electrical signal,
means for detecting the position of said human finger in said orthogonal fields and producing second electrical signals, respectively, and
a utilization device coupled to receive said first and said second electrical signals.

20. In a resistive surface, improvements in electrical edge termination to said resistive surface comprising a plurality of rows of conductive segments overlying the edge of said resistive surface, the conductive segments in each row of conductive segments having a length in the direction of said edge which is longer than the length of segments in the row preceding it.

21. The invention defined in claim 20 wherein the center ones of said conductive segments in each row are conductively interconnected.

22. The invention defined in claim 20 wherein said conductive segments vary the resistivity of said edges parabolically.

23. Improvements in electrical edge termination of a resistive surface comprising a plurality of rows of conductive segments overlying an edge of said resistive surface, the conductive segments in each row of conductive segments having lengths in the direction of said edge that are longer than the lengths of segments in the next row more proximate to the center of said surface.

24. The invention defined in claim 23 wherein one or more of said conductive segments in one of said rows are conductively interconnected with one or more of said conductive segments in another of said rows.

25. The invention defined in claim 23 wherein said resistive surface possesses uniform resistivity and said conductive segments, in combination with said resistive surface, lower the resistance along said edge in such a manner that when a potential difference is established between the two extreme segments of the row most distant from the center of said resistive surface, essentially uniform potential difference will exist between adjacent conductive segments in the row nearest the center of said resistive surface.

26. The invention defined in claim 23 wherein the geometry of said conductive segments and their placement on said resistive surface are such as to constitute a current distributor that adjusts the distribution of current to said resistive surface in a predetermined manner.

* * * * *